United States Patent [19]

Fujita

[11] Patent Number: 5,133,008
[45] Date of Patent: Jul. 21, 1992

[54] IMAGE SIGNAL PROCESSING DEVICE

[75] Inventor: Shinichi Fujita, Hamamatsu, Japan

[73] Assignee: Yamaha Corporation, Hamamatsu, Japan

[21] Appl. No.: 676,204

[22] Filed: Mar. 27, 1991

[30] Foreign Application Priority Data

Mar. 29, 1990 [JP] Japan .................. 2-33508[U]

[51] Int. Cl.$^5$ .................................. H04N 7/167
[52] U.S. Cl. ........................... 380/5; 380/7; 380/23; 360/60
[58] Field of Search .......... 380/5, 7, 10, 15, 18, 380/23, 25; 360/60

[56] References Cited

U.S. PATENT DOCUMENTS 4,631,603 12/1986 Ryan ...................... 380/5 X
4,695,901 9/1987 Ryan ........................ 380/5

Primary Examiner—Bernarr E. Gregory
Attorney, Agent, or Firm—Spensley Horn Jubas & Lubitz

[57] ABSTRACT

An image signal processing device used in image signal reproducing devices such as laser vision disk players and video tape recorders for processing an image signal including a copy guard signal includes a synchronizing signal detection circuit for detecting a vertical synchronizing signal and a horizontal synchronizing signal from the image signal, a counter for counting the number of the detected horizontal synchronizing signals starting from each detected vertical synchronizing signal, a copy guard signal section indication circuit for indicating a section including the copy guard signal in the image signal, a count control circuit for causing the counter to stop counting of the detected horizontal synchronizing signals or to count a substitution signal which substitutes the detected horizontal synchronzing signals during the indicated section including the copy guard signal, and an image signal processing circuit for processing the image signal in response to the count provided by the counter. An erroneous operation in the image signal processing such as production of superimposed characters due to an erroneous counting of the copy guard signal can be prevented.

8 Claims, 5 Drawing Sheets

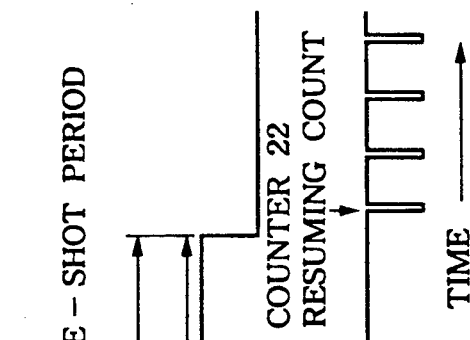
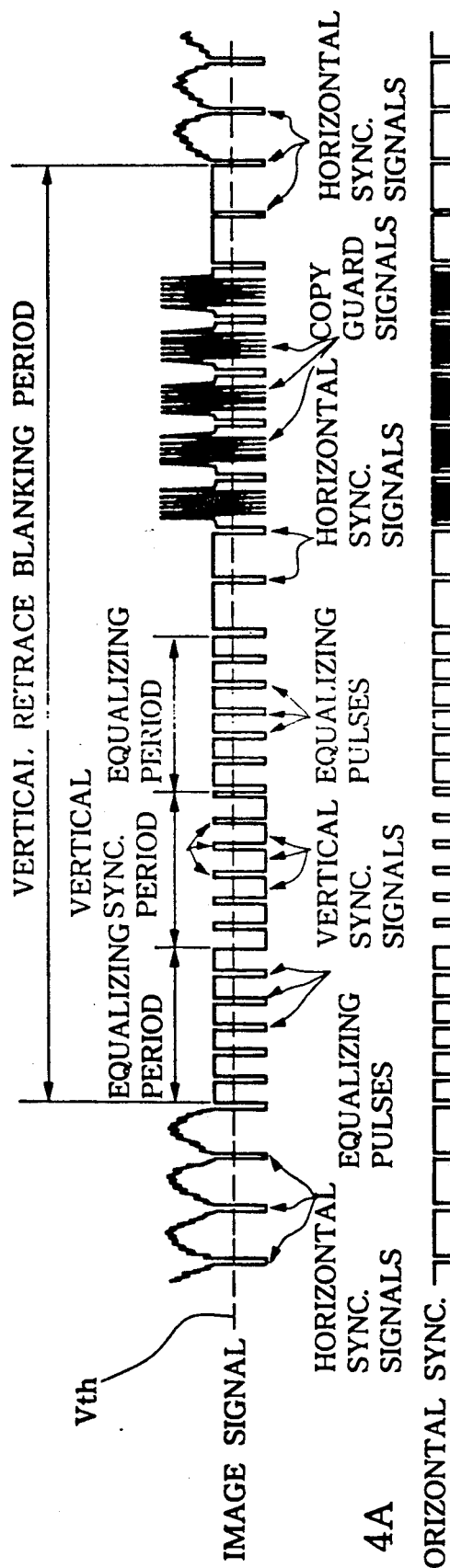

IMAGE SIGNAL PROCESSING DEVICE

BACKGROUND OF THE INVENTION

This invention relates to an image signal processing device used in image signal reproduction devices such as laser vision disc players and video tape recorders and, more particularly, to an image signal processing device capable of preventing occurrence of an erroneous operation caused by insertion of a copy guard signal in an image signal reproduced by such image reproduction devices.

There are laser vision disk players and video tape recorders which have a function of displaying various characters such as channel numbers, volume levels, chapter numbers, frame numbers and operation modes superimposed on an image displayed on a television screen. Positions of these superimposed characters to be displayed are controlled normally by counting the number of horizontal synchronizing signals after occurrence of a vertical synchronizing signal.

Some recorded original video tapes and discs have a so-called copy guard signal recorded thereon for preventing copying thereof. Among various methods for prohibiting copying of a video tape or disk by using a copy guard signal, there is generally known a method according to which a synchronizing signal is modified so as to prohibit synchronization when a copied tape or disk is reproduced and thereby making a reproduced picture of such copied tape or disk too instable to watch properly. In this type of copy guard method, the copy guard signal is recorded in a section following an equalizing period in a vertical retrace blanking period as shown in FIG. 2A.

A horizontal synchronizing signal is detected generally by comparing an image signal with a predetermined threshold value. When an image signal including a copy guard signal as shown in FIG. 2A is compared with a threshold value Vth, the result of comparison becomes an output shown in FIG. 2B which includes the copy guard signal.

For this reason, when the display position of characters to be superimposed on an image is determined by counting the detected horizontal synchronizing signal, superimposed characters such as a channel display 12 and volume display 14 on a television screen 10 shown in FIG. 3 are shifted from correct positions shown by solid lines to incorrect positions shown by dotted lines.

It is, therefore, an object of the invention to provide an image signal processing device capable of preventing occurrence of an erroneous operation caused by insertion of a copy guard signal in an image signal in a signal processing operation such as production of a superimposed character.

SUMMARY OF THE INVENTION

For achieving the above described object, the image signal processing device according to the invention for processing an image signal including a copy guard signal comprises synchronizing signal detection means for detecting a vertical synchronizing signal and a horizontal synchronizing signal from the image signal, counter means for counting the number of detected horizontal synchronizing signals starting from each detected vertical synchronizing signal, copy guard signal section indication means for indicating a section including the copy guard signal in the image signal, count control means for causing the counter means to stop counting of the detected horizontal synchronizing signals or to count a substitution signal which substitutes the detected horizontal synchronizing signals during the indicated section includign the copy guard signal, and image signal processing means for processing the image signal in response to count provided by the counter means.

According to the invention, the section including the copy guard signal in the image signal is indicated and the counting of the horizontal synchronizing signals by the counter means is stopped or substituted by counting of the substitution signal and an erroneous counting of the copy guard signal by the counter means thereby is prevented. Accordingly, by applying this invention to production of superimposed characters, superimposed characters can be displayed accurately in correct positions on a television screen. This invention can be applied also to various image signal processing devices other than the device producing superimposed characters for preventing occurrence of an erroneous operation in a signal processing.

Preferred embodiments of the invention will be described below with reference to the accompanying drawings.

BRIEF DESCRIPTION OF THE DRAWINGS

In the accompanying drawings,

FIGS. 4A to 4E are waveform diagrams showing the operation of the device shown in FIG. 1;

DESCRIPTION OF PREFERRED EMBODIMENTS

Figure 1:
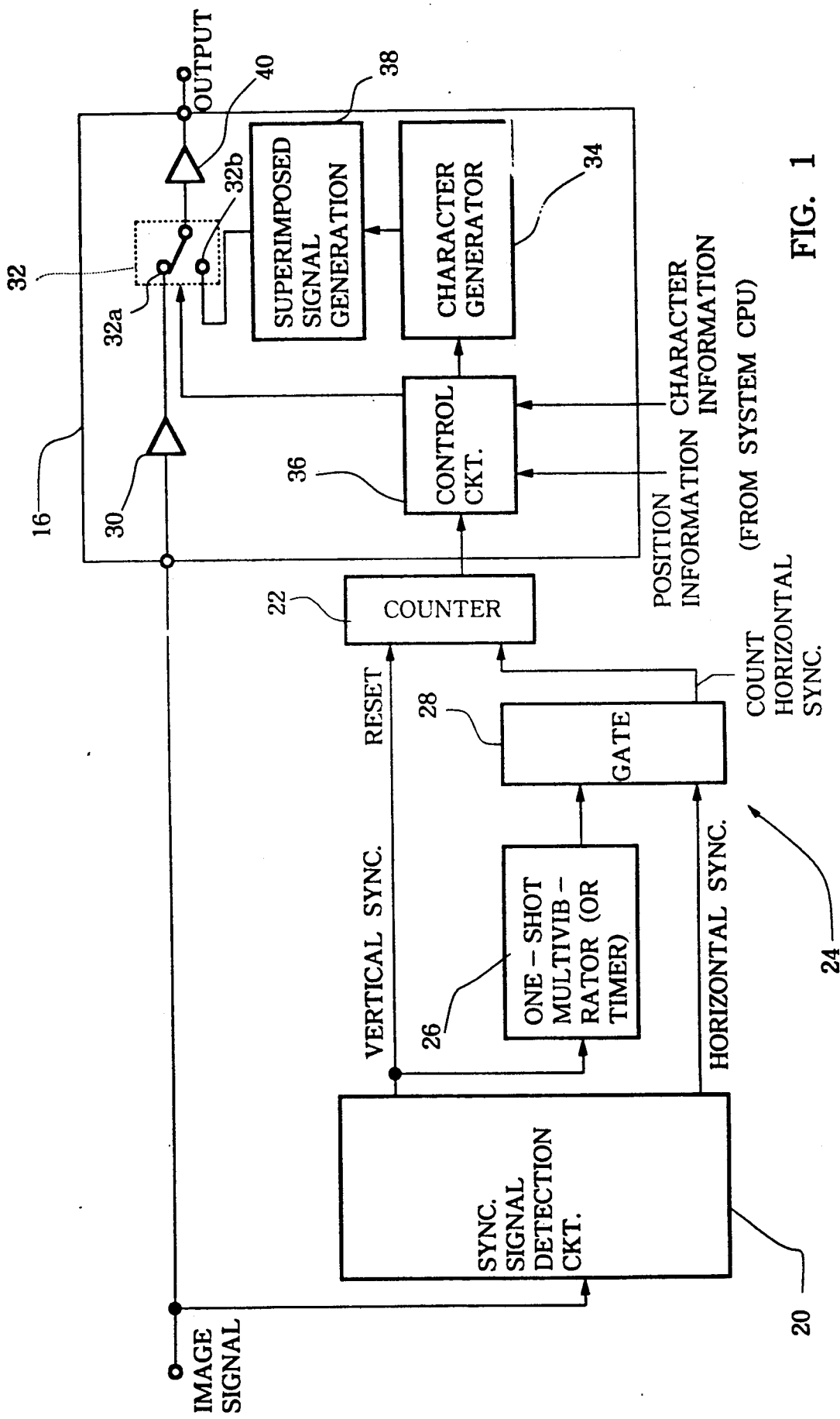
FIG. 1 is a block diagram showing a first embodiment of the invention.
Figure 2A:
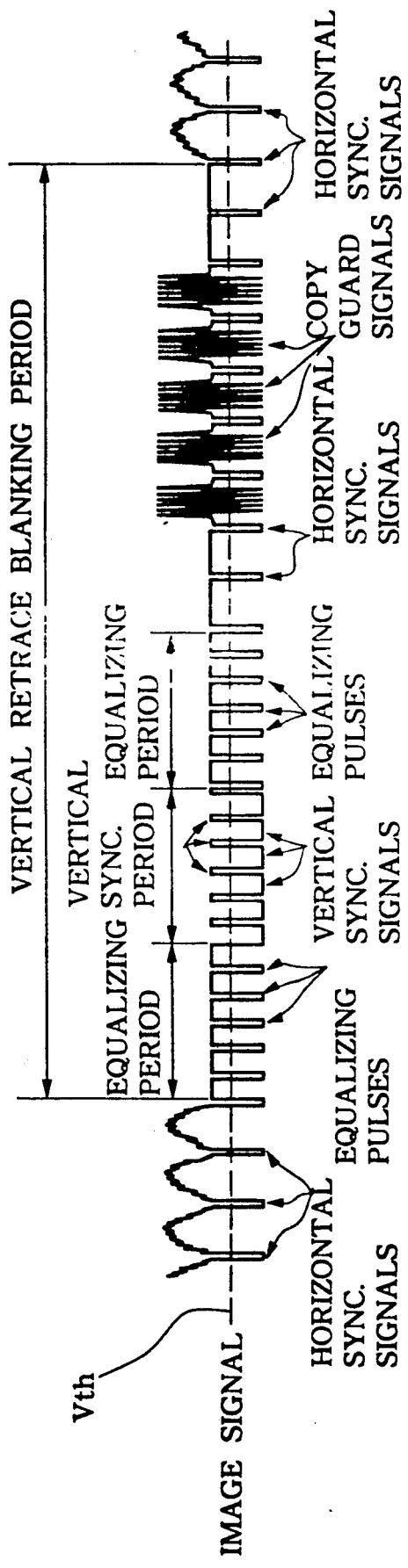
FIGS. 2A and 2B are waveform diagrams showing an example of an image signal including a copy guard signal, and a horizontal synchronizing signal detected from this image signal.
Figure 2B:
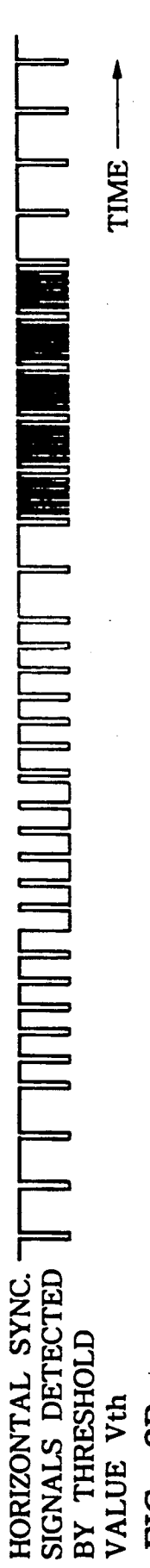
Figure 3:
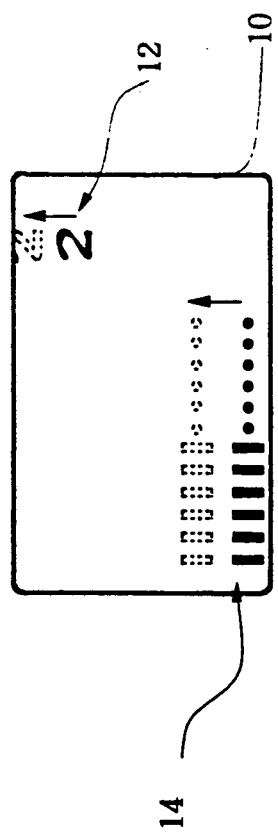
FIG. 3 is a diagram showing an example of a picture on a television screen in a case where superimposed characters are produced by counting the signal of FIG. 2B.

FIG. 1 shows an embodiment in which a substitution signal is supplied to cause a counter to count it instead of a detected horizontal synchronizing signal during a section including a copy guard signal in an image signal.

An image signal which has been reproduced from a laser vision disk or video tape and demodulated is applied to an image signal processing circuit 16 for production of a superimposed character.

A synchronizing signal detection circuit 20 separates and detects a vertical synchronizing signal and a horizontal synchronizing signal from the image signal. A counter 22 counts the number of the horizontal synchronizing signals starting from occurrence of each vertical synchronizing signal, thereby detecting which scanning line is currently being scanned. The counter 22 is reset at the detection of each vertical synchronizing signal and counts up by one at the falling of each horizontal synchronizing signal.

A one-shot multivibrator 26 indicates a section including a copy guard signal in an image signal and constitutes the copy guard signal section indication means in the invention. The one-shot multivibrator 26 is triggered by detection of a vertical synchronizing signal and thereupon produces a signal during a certain period including the copy guard signal. The one-shot multivibrator 26 can be constructed of an analog or digital hardware circuit or a computer program executed by a microcomputer. Alternatively, the copy guard signal section indication means may be constructed of a timer which counts a predetermined length of time.

A gate circuit 28 which constitutes the count control means receives the signal from the one-shot multivibrator 26 and the horizontal synchronizing signal detected by the synchronizing signal detection circuit 20 and gates off the horizontal synchronizing signal while the one-shot multivibrator 26 produces the signal.

In the image signal processing circuit 16, the image signal is applied to an input 32a of an analog switch 32 through a buffer amplifier 30. A character generator 34 prestores pattern information of various characters to be displayed on a television screen.

A control circuit 36 is a circuit provided for displaying superimposed characters at a proper timing. The control circuit 36 receives character information (information representing characters to be displayed) and position information (position in the television screen at which the characters should be displayed) from a system CPU (not illustrated) and compares the scanning line position (a specific scanning line and a specific horizontal position on the scanning line) which is currently detected by the counter 22 with the position information. Upon coincidence of the scanning line position with the position information, the control circuit 36 causes the character generator 34 to produce pattern information, i.e., an image signal having a character pattern and a color corresponding to the character information at a timing of this coincidence. This image signal is supplied to an input 32b of the analog switch 32 through a superimposed signal generation circuit 38.

The control circuit 36 causes the analog switch 32 to be connected to the input 32b during presence of a superimposed signal from the superimposed signal generation circuit 38 and to the input 32a during absence of the superimposed signal. The analog switch 32 thereby produces the image signal imparted with the superimposed signal and this image signal is supplied to a television screen through a buffer amplifier 40 whereby an image superimposed by a character is displayed on the television screen.

The operation of the embodiment of FIG. 1 is shown in FIGS. 4A to 4E. FIG. 4A shows a vertical retrace blanking period of an image signal. A copy guard signal is recorded as a high-frequency signal with a sharply fluctuating level in a section following a synchronizing period. The synchronizing signal detection circuit 20 compares this image signal with a threshold value Vth and thereby produces a horizontal synchronizing signal shown in FIG. 4B. This horizontal synchronizing signal includes the copy guard signal.

The synchronizing signal detection circuit 20 detects a vertical synchronizing period signal as shown by FIG. 4C by, for example, detecting lasting of a bottom level state of the image signal in excess of a predetermined period of time (e.g., a time length which is somewhat longer than the pulse width of the horizontal synchronizing signal). The counter 22 is reset at the falling edge of the vertical synchronizing periodical signal. The one-shot multivibrator 26 is triggered at the falling edge of the vertical synchronizing periodical signal to produce a signal shown in FIG. 4D which maintains a high level during a certain period T (i.e., a period within the vertical retrace blanking period and including the copy guard signal). The gate circuit 28 gates off the horizontal synchronizing signal and outputs a signal shown in FIG. 4E during this period T. Since the copy guard signal is eliminated in the signal of FIG. 4E, the counter 22 is protected from performing an erroneous counting and resumes counting after ending of this period T. Accordingly, by performing the display position control for superimposed characters on the basis of the count of the counter 22, the superimposed characters can be displayed at correct positions in the television screen.

As shown by a dotted line in FIG. 4D, the one-shot multivibrator 26 may be triggered at the rising edge of the vertical synchronizing period signal and, in this case, the period during which a high-level signal is produced from the one-shot multivibrator 26 becomes T' shown by a dotted line in FIG. 4D. The output of the gate circuit 28 in this case becomes as shown by a dotted line in FIG. 4E. The counter 22 therefore counts the horizontal synchronizing signals from being reset at falling of the vertical synchronizing period signal till rising thereof, thereafter suspends counting and resumes counting after passing of the copy guard signal.

Figure 5:
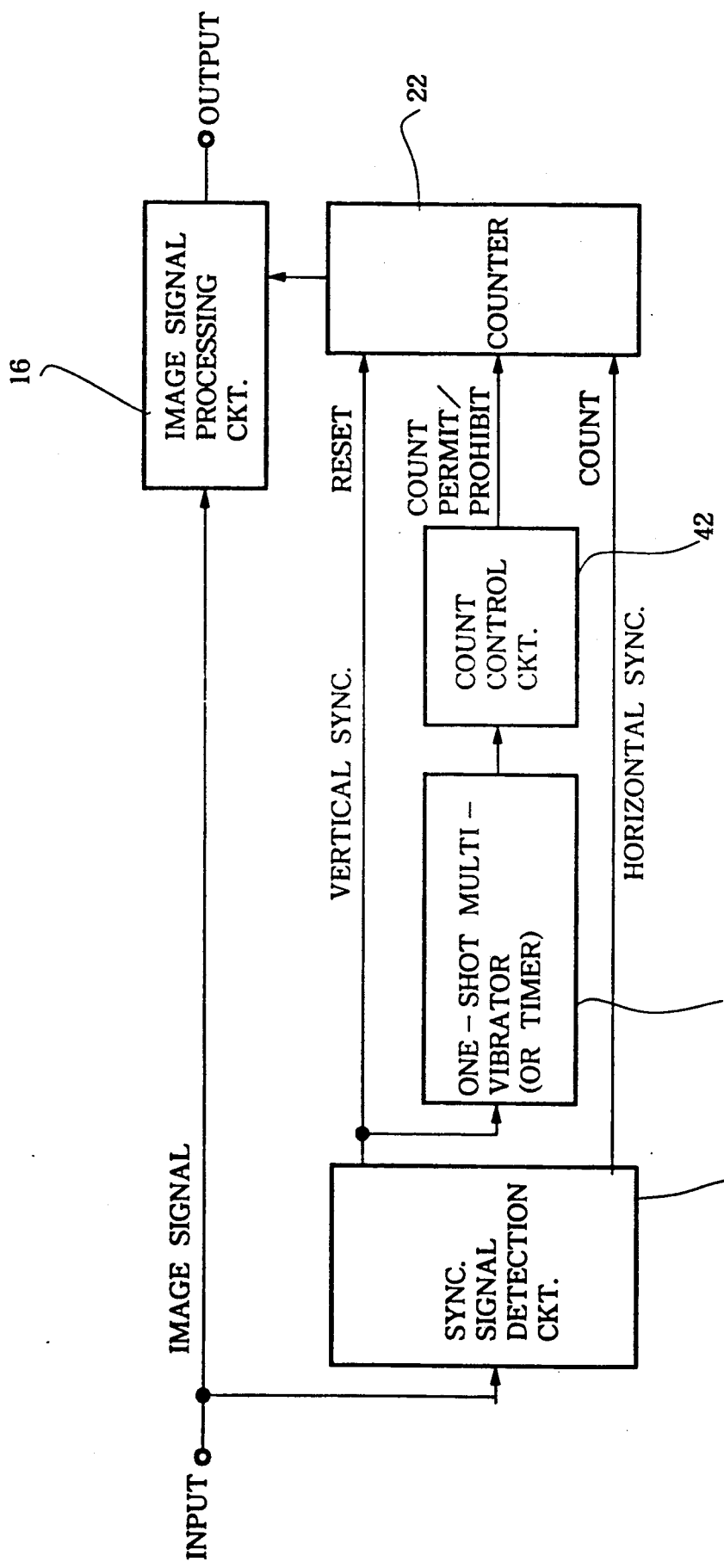
FIG. 5 is a block diagram showing a second embodiment of the invention.

FIG. 5 shows an embodiment in which counting of the horizontal synchronizing signal is stopped by prohibiting the counting operation by the counter means in a section including the copy guard sigal. In the embodiment of FIG. 5, the same component parts as those in FIG. 1 are designated by the same reference characters.

An image signal is applied to an image signal processing circuit 16. A synchronizing signal detection circuit 20 detects a vertical synchronizing signal and a horizontal synchronizing signal in the image signal. A one-shot multivibrator 26 (i.e., the copy guard signal section indication means) is triggered by the vertical synchronizing period signal and produces a signal indicating a section including the copy guard signal.

A counter 22 is reset by the vertical synchronizing period signal and counts the number of the horizontal synchronizing signals. A counter control circuit 42 either permits or prohibits the counting operation of the counter 22. That is, the counter control circuit 42 prohibits the counting operation during the period of time during which one-shot multivibrator 26 produces the signal indicating the section including the copy guard signal and permits the counting operation during other period of time.

An image signal processing circuit 16 performs an image signal processing such as production of superimposed characters on the basis of the count of the counter 22. In this case also, the counter 22 is protected from erroneously counting the copy guard signal and the image signal processing can be accurately performed.

Figure 6:
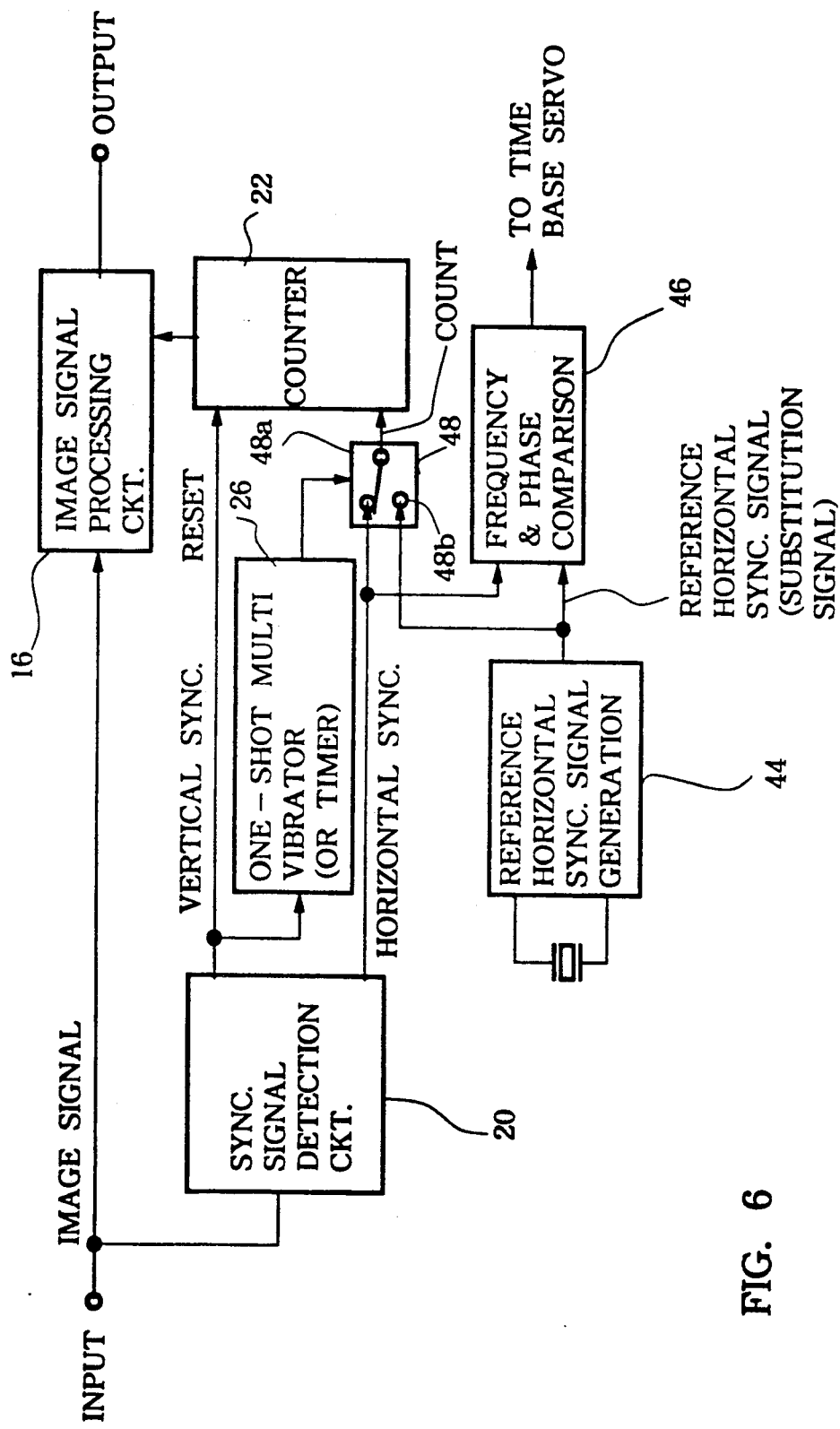
FIG. 6 is a block diagram showing a third embodiment of the invention.

FIG. 6 shows an embodiment in which the section including the copy guard signal is substituted by a reference horizontal synchronizing signal. The same component parts in this embodiment as those in the embodiments of FIGS. 1 and 5 are designated by the same reference characters as those of FIGS. 1 and 5.

An image signal is applied to an image signal processing circuit 16. A synchronizing signal detection circuit 20 detects a vertical synchronizing period signal and a horizontal synchronizing signal in the image sigal. A one-shot multivibrator 26 (i.e., the copy guard signal section indication means) is triggered by the vertical synchronizing period signal and produces a signal indicating a section including the copy guard signal.

A reference horizontal synchronizing signal generation circuit 44 generates a reference horizontal synchronizing signal by frequency dividing a clock generated by a crystal oscillator. A frequency and phase comparison circuit 46 compares the reference horizontal synchronizing signal with the horizontal synchronizing signal detected from the image signal in their frequency and phase and thereby performs a time base servo control.

An analog switch 48 which constitutes the counter control means inputs at its input 48a the horizontal synchronizing signal detected from the image signal and inputs in the other input 48b the reference horizontal synchronizing signal (substitution signal). The analog switch 48 is connected to the input 48a to produce the horizontal synchronizing signal detected from the image signal during a period in which the one-shot multivibrator 26 does not produce a high-level signal and is connected to the input 48b to produce the reference horizontal synchronizing signal during a period in which the one-shot multivibrator 26 produces the high-level signal. The counter 22 counts up by the horizontal synchronizing signal provided from the analog switch 48.

The image signal processing circuit 16 performs signal processing such as production of superimosed characters on the basis of the count of the counter 22. In this case also, the counter 22 is protected from an erroneous counting of the copy guard signal and the image signal processing can thereby be accurately performed.

In the above described embodiments, the counting operation of the counter is suspended for a certain period of time after occurrence of the vertical synchronizing signal regardless of presence or absence of the copy guard signal. Alternatively, presence or absence of the copy guard signal may be detected and the counting operation may be stopped only when the copy guard signal is present.

In the above described embodiments, description has been made about the case where this invention has been applied to the superimposed character production processing. The invention however is applicable to various other image signal processings in which control is made on the basis of a count of a counter.

In the above described embodiments, description has been made about the case where the invention has been applied to the image signal including the copy guard signal shown in FIG. 4a. The invention however is applicable to image signals including various other copy guard signals.

In the above described embodiments, the copy guard signal section indication means is constructed of a one-shot multivibrator or a timer. Alternatively, the copy guard signal may actually be detected and the counting operation may be stopped only during presence of the copy guard signal.

What is claimed is:

1. An image signal processing device for processing an image signal including a copy guard signal comprising:

synchronizing signal detection means for detecting vertical synchronizing signals and horizontal synchronizing signals from the image signal;

counter means for counting the detected horizontal synchronizing signals, wherein the counter means is reset by each detected vertical synchronizing signal;

copy guard signal section indication means for providing an indication when a section of the image signal includes the copy guard signal;

count control means for causing the counter means to count a substitution signal in response to the indication provided by the copy guard signal section indication means; and image signal processing means, responsive to the counter means, for processing the image signal in accordance with the counting of the detected horizontal synchronizing signals.

2. An image signal processing device as defined in claim 1 wherein said count control means comprises gate means for gating off the detected horizontal synchronizing signal and supply means for supplying to the counter means the substitution signal in response to the indication provided by the copy guard signal section indication means, whereby the counter means stops counting the detected horizontal synchronizing signals when it is supplied with the substitution signal.

3. An image signal processing device as defined in claim 1, further including a reference horizontal synchronizing signal generating circuit for generating a reference horizontal synchronizing signal, wherein said count control means comprises a switch including first and second inputs and an output, the output being connected to the counter means, the first input being connected to the synchronizing signal detection means so as to receive the detected horizontal synchronizing signals, the second input being connected to which the reference horizontal synchronizing signal generating circuit, wherein the reference horizontal synchronizing signal is supplied to the counter in response to the indication provided by the copy guard signal section indication means.

4. An image signal processing device as defined in claim 1 wherein said image signal processing means comprises:

control means for receiving predetermined character information, display position information and the count from the counter means, the control means providing the character information and the display position information as an output when the count from the counter means coincides with the received display position information;

a character generator for prestoring pattern information of characters, the character generator being responsive to the control means for providing pattern information corresponding to the predetermined character information corresponding to the predetermined character information received by the control means;

superimposed signal generation means connected to the character generator for producing a superimposed signal in response to the pattern information supplied from the character generator; and switch means having an output and a first input which is connected to the superimposed signal generation means such that the switch means provides an image signal on the output imparted with the superimposed signal when the superimposed signal is produced, the switch means having a second input to which the image signal is applied such that the switch means provides the image signal on the output without the superimposed signal when the superimposed signal is not produced.

5. An image signal processing device as defined in claim 1 wherein said copy guard signal section indication means comprises a one-shot multivibrator which produces a signal representing a section of the image signal which includes the copy guard signal upon detection of a predetermined vertical synchronizing signal by the synchronizing signal detection means.

6. An image signal processing device as defined in claim 1 wherein said copy guard signal section indication means comprises a timer which produces a signal representing a section of the image signal which includes the copy guard signal upon detection of a predetermined vertical synchronizing signal by the synchronizing signal detection means.

7. An image signal processing device for processing an image signal including a copy guard signal comprising:
  synchronizing signal detection means for detecting vertical synchronizing signals and horizontal synchronizing signals from the image signal;
  counter means for counting the detected horizontal synchronizing signals, wherein the counter means is reset by each detected vertical synchronizing signal;
  copy guard signal section indication means for providing an indication when a section of the image signal includes the copy guard signal;
  count control means for causing the counter means to stop counting the detected horizontal synchronizing signals in response to the indication provided by the copy guard signal section indication means; and
  image signal processing means, responsive to the counter means, for processing the image signal in accordance with the counting of the detected horizontal synchronizing signals.

8. An image signal processing device as defined in claim 7 wherein said count control means comprises means for prohibiting counting by the counter means in response to the indication provided by the copy guard signal section indication means and permitting counting by the counter means in an absence of the indication from the copy guard signal section indication means.

* * * * *